United States Patent
Gangopadhyay et al.

(10) Patent No.: US 6,182,024 B1
(45) Date of Patent: Jan. 30, 2001

(54) MODELING BEHAVIORS OF OBJECTS ASSOCIATED WITH FINITE STATE MACHINES AND EXPRESSING A SEQUENCE WITHOUT INTRODUCING AN INTERMEDIATE STATE WITH THE ARC LANGUAGE

(75) Inventors: Dipayan Gangopadhyay, Cupertino; Subrata Mitra, San Jose, both of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 08/951,811

(22) Filed: Oct. 14, 1997

(51) Int. Cl.[7] .............................. G06F 15/00; G06F 11/00
(52) U.S. Cl. .................................. 703/22; 717/1; 717/5; 717/7; 345/440
(58) Field of Search .................................... 345/440, 327, 345/326; 395/500.02, 500.04, 500.05, 500.34, 500.38, 500.35, 500, 43; 714/738; 707/103, 104; 703/22, 2; 717/1, 7, 5

(56) References Cited

U.S. PATENT DOCUMENTS

| | | | |
|---|---|---|---|
| 4,885,717 | * 12/1989 | Beck et al. ........................... | 703/22 |
| 5,297,150 | * 3/1994 | Clark ................................... | 714/26 |
| 5,408,597 | * 4/1995 | Kita et al. ............................ | 345/440 |
| 5,555,201 | * 9/1996 | Dangelo et al. .................... | 395/500.02 |
| 5,615,333 | * 3/1997 | Juettner et al. ..................... | 714/38 |
| 5,680,332 | * 10/1997 | Raimi et al. ........................ | 395/500.34 |
| 5,794,040 | * 8/1998 | Ono et al. ........................... | 395/701 |
| 5,870,590 | * 2/1999 | Kita et al. ........................... | 395/500.05 |
| 5,893,913 | * 4/1999 | Brodsky et al. .................... | 707/201 |
| 5,895,472 | * 4/1999 | Brodsky et al. .................... | 707/203 |
| 5,907,706 | * 5/1999 | Brodsky et al. .................... | 395/701 |
| 5,910,958 | * 6/1999 | Jay et al. ............................. | 714/738 |
| 5,917,498 | * 6/1999 | Korenshtein ........................ | 345/433 |
| 5,960,199 | * 9/1999 | Brodsky et al. .................... | 395/704 |
| 5,983,016 | * 11/1999 | Brodsky et al. .................... | 395/701 |
| 5,991,536 | * 11/1999 | Brodsky et al. .................... | 395/704 |
| 6,011,559 | * 1/2000 | Gangopadhyay et al. ........... | 345/440 |

OTHER PUBLICATIONS

Gangopadhyay, Dipayan, et al., Research Report, "Obj-Chart-Builder: An Environment for Executing Visual Object Models", IBM Research Division, pp. 1–16, Apr. 29, 1993.

Gangopayhyay, Dipayan, et al., "ObjChart: Tangible Specification of Reactive Object Behavior", *Proceedings of the Seventh European Conference on Object Oriented Programming*, Jul. 26–30, 1993, pp. 432–457.

Misra, Jayadev, "Equational Reasoning About Nondeterministic Processes", *Formal Aspects of Computing*, vol. 2, No. 2, pp. 167–195, Apr.–Jun. 1990.

"ObjChart–builder: An Environment for Executing Visual Models", Gangopadhyay et al., 1993.*

"ObjChart: Tangible Specification of Reactive Object Behavior", Gangopadhyay et al., 1993, Object–Oriented Programming, 7th European Conference.*

"Contracts: Specifying Behavioral Compositions in Object Oriented Systems", Helm et al., ECOOP/OOPSLA 1990 Proceedings.*

"Monitoring Semantics: A Formal Framework for Specifying Implementing, and Reasoning about Execution Monitors", Kishon et al., ACM 1991.*

(List continued on next page.)

*Primary Examiner*—Eric W. Stamber
*Assistant Examiner*—William Thomson
(74) *Attorney, Agent, or Firm*—Gates & Cooper

(57) ABSTRACT

A method, apparatus, and article of manufacture for object modeling. An object model is created in a computer using an executable visual specification language to model behaviors of one or more objects within the object model. A sequence of actions can then be expressed within the executable visual specification language for the behaviors of the objects within the object model.

30 Claims, 9 Drawing Sheets

OTHER PUBLICATIONS

"The UAN: A User Oriented Representation for Direct Manipulation Interface Designs", Hartson et al. ACM Transactions on Information Systems, vol. 8, No. 3, Jul. 1990, pp. 181–203.*

Rational Rose, "Using Rational Rose 4.0", Rational Software Company, 1996.*

"Object Oriented Specification and its Generation for Compiler", Wu et al, ACM 1992.*

"A New Formalism for Discrete Event Simulation", Radiya et al., 1987.*

"Report on the Workshop Framework—Centered Software Development", Gangopadhyay et al., 1995.*

"Attribute GrammarParadigms—A High Level Methodology in Language Implementation", Paakki, 1995.*

* cited by examiner

----- Sequential Dependency
(lower node depends on the upper)

——— Nodes in parallel (no dependency)

↑ Dependency due to Object Queues
(actually, this is a temporal dependency)

MODELING BEHAVIORS OF OBJECTS ASSOCIATED WITH FINITE STATE MACHINES AND EXPRESSING A SEQUENCE WITHOUT INTRODUCING AN INTERMEDIATE STATE WITH THE ARC LANGUAGE

CROSS-REFERENCE TO RELATED APPLICATIONS

This application is related to the following co-pending and commonly-assigned patent applications:

application Ser. No. 08/747,415, entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996, by Stephen A. Brodsky et al.;

application Ser. No. 08/747,414, entitled "LAYOUT METHOD FOR ARC-DOMINATED LABELLED GRAPHS," filed on Nov. 12, 1996, by Dipayan Gangopadhyay, et al.;

application Ser. No. 08/747,416, entitled "MULTI-OBJECT VIEWS IN AN OBJECT MODELING TOOL," filed on Nov. 12, 1996, by Roni Korenshtein.;

application Ser. No. 08/747,057, entitled "INTERACTIVE MODELING AGENT FOR AN OBJECT-ORIENTED SYSTEM," filed on Nov. 12, 1996, by Stephen A. Brodsky et al.;

application Ser. No. 08/747,058, entitled "EXECUTION ENGINE IN AN OBJECT MODELING TOOL," filed on Nov. 12, 1996, by Stephen A. Brodsky et al.;

application Ser. No. 08/747,417, entitled "NOTIFICATION MANAGER FOR OBJECT-ORIENTED SYSTEMS," filed on Nov. 12, 1996, by Stephen A. Brodsky et al.;

application Ser. No. 08/850,829, entitled "METHOD FOR SYNCHRONIZATION BETWEEN LINKS AND GROUP DEFINITIONS WITHIN AN OBJECT-ORIENTED SYSTEM," filed on May 2, 1997, by Stephen A. Brodsky, et al.;

application Ser. No. 08/850,858, entitled "OBJECT OUTLINE VIEW FOR GROUPS WITHIN AN OBJECT-ORIENTED SYSTEM," filed on May 2, 1997, by Stephen A. Brodsky, et al.;

application Ser. No. 08/850,214, entitled "METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM," filed on May 2, 1997, by Stephen A. Brodsky, et al.;

application Ser. No. 08/850,832, entitled "CHANGE AND ACCOUNTING LOG FOR OBJECT-ORIENTED SYSTEMS," filed on May 2, 1997, by Stephen A. Brodsky, et al.;

application Ser. No. 08/850,838, entitled "MODEL TRACE VIEW FOR OBJECT-ORIENTED SYSTEMS," filed on May 2, 1997, by Stephen A. Brodsky et al.;

application Ser. No. 08/850,337, entitled "FRACTAL NESTED LAYOUT FOR HIERARCHICAL SYSTEMS," filed on May 2, 1997, by Stephen A. Brodsky.;

application Ser. No. 08/850,847, entitled "REFERENCE ATTRIBUTES WITHIN AN OBJECT-ORIENTED SYSTEM," filed on May 2, 1997, by Stephen A. Brodsky.;

all of which applications are incorporated by reference herein.

BACKGROUND OF THE INVENTION

1. Field of the Invention

This invention relates in general to object-oriented programming systems, and in particular, to a method for adding sequentiality to an arc language in an object modeling tool used in an object-oriented programming system.

2. Description of Related Art

Object modeling tools are available that provide an executable visual specification language for modeling the dynamic behavior of objects. An example is object modeling tools that are used to specify finite state machines (FSMs) of the Mealy machine variety, which are used extensively in telecommunication protocol design and object-oriented computer-assisted software engineering (CASE).

The reactive behavior of each object is specified by associating an extended finite-state machine with the object or by using object integration diagrams. The finite-state machines use an arc-language for behavioral specifications, while object interaction diagrams use constructs similar to the arc-language. Generally, each arc consists of an event-condition-actions triple: an "event" is a trigger in time, which may result in a state transition, concurrently initiating the actions, provided the corresponding condition holds.

However, existing arc-languages are weak on two counts: they cannot directly express sequencing of actions, and there is no way to refine conditions within the visual framework. The present invention solves these problems by introducing an additional connective for sequencing of actions and extending conditions to invoke events. Since it is preferable to remove some of the duality between methods and events, the present invention also incorporates return values from events.

SUMMARY OF THE INVENTION

To overcome the limitations in the prior art described above, and to overcome other limitations that will become apparent upon reading and understanding the present specification, the present invention discloses a method, apparatus, and article of manufacture for object modeling. An object model is created in a computer using an executable visual specification language to model behaviors of one or more objects within the object model. A sequence of actions can then be expressed within the executable visual specification language for the behaviors of the objects within the object model.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
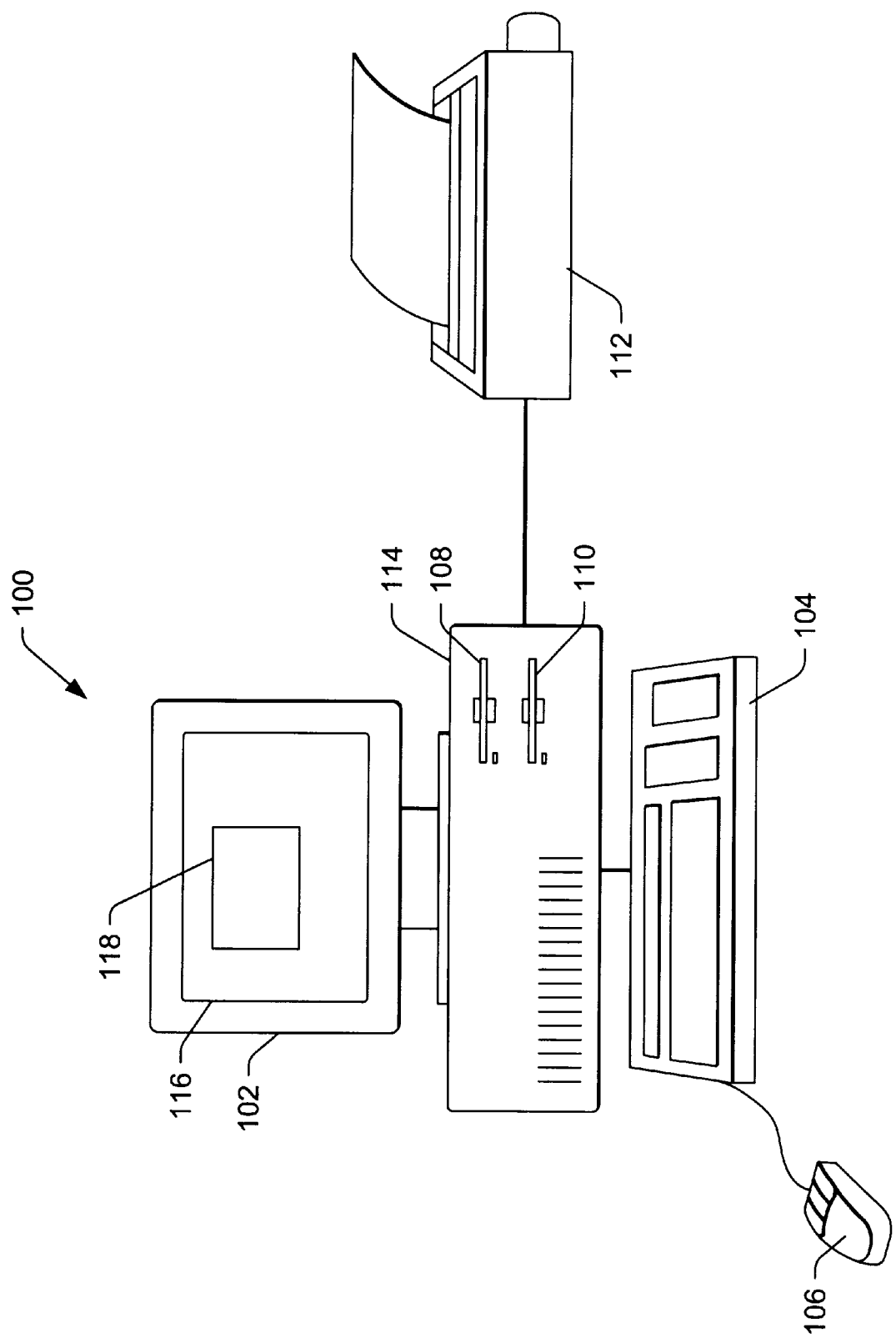
FIG. 1 illustrates an exemplary computer hardware environment compatible with the present invention.

FIG. 1 illustrates an exemplary environment that could be used with the present invention. The present invention his typically implemented using a computer 100, wherein the computer 100 comprises a processor, random access memory (RAM), read-only memory (ROM) and/or other components. The computer 100 may be coupled to I/O devices, such as a monitor 102, keyboard 104, mouse device 106, fixed and/or removable data storage devices 108 and 110, and printer 112. The computer 100 could also include data communications devices (not shown) for coupling to other I/O devices, including a local area network (LAN) or wide area network (WAN) via interface cable 114. Of course, those skilled in the art will recognize that any combination of the above components, or any number of different components, peripherals, and other devices, may be used with the computer 100.

Generally, the computer 100 operates under control of an operating system 116, which is represented by the display on the monitor 102. The present invention is preferably implemented within an Object Modeling Tool comprised of one or more computer programs 118, which are represented by the window displayed on the monitor 102 operating under the control of the operating system 116. In alternative embodiments, the present invention may be implemented in the operating system 116 itself.

The operating system 116 is booted into the memory of the computer 100 for execution when the computer 100 is powered-on or reset. In turn, the operating system 116 then controls the execution of the computer programs 118 by the computer 100. The operating system 116 and computer programs 118 are comprised of instructions which, when read and executed by the computer 100, causes the computer 100 to perform the steps necessary to implement and/or use the present invention.

Generally, the operating system 116 and/or computer programs 118 are tangibly embodied in and/or readable from a device, carrier, or media, such as a memory, data storage devices 108 and/or 110, and/or remote devices accessible via data communications devices. Under control of the operating system 116, the computer programs 118 may be loaded from the memory, data storage devices 108 and/or 110, and/or remote devices into the memory of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to a computer program performing the same or similar functionality. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of the Object Modeling Tool

1. Introduction

FIGS. 2–11 illustrate the operation of the Object Modeling Tool according to the present invention. As described above, the Object Modeling Tool comprises a collection of computer programs 118, which were known previously as objChart™ and now as Dynamic Designer™.

The computer programs 118 of the present invention provides an executable visual specification language for modeling dynamic behavior of objects, as described in D. Gangopadhyay and S. Mitra, *ObjChart: Tangible Specification of Reactive Object Behavior*, Proceedings of the European Conference on Object Oriented Programming (ECOOP '93), Vol. 707, pages 432–457 of Lecture Notes in Computer Science, 1993, which publication is incorporated by reference herein.

Figure 2:
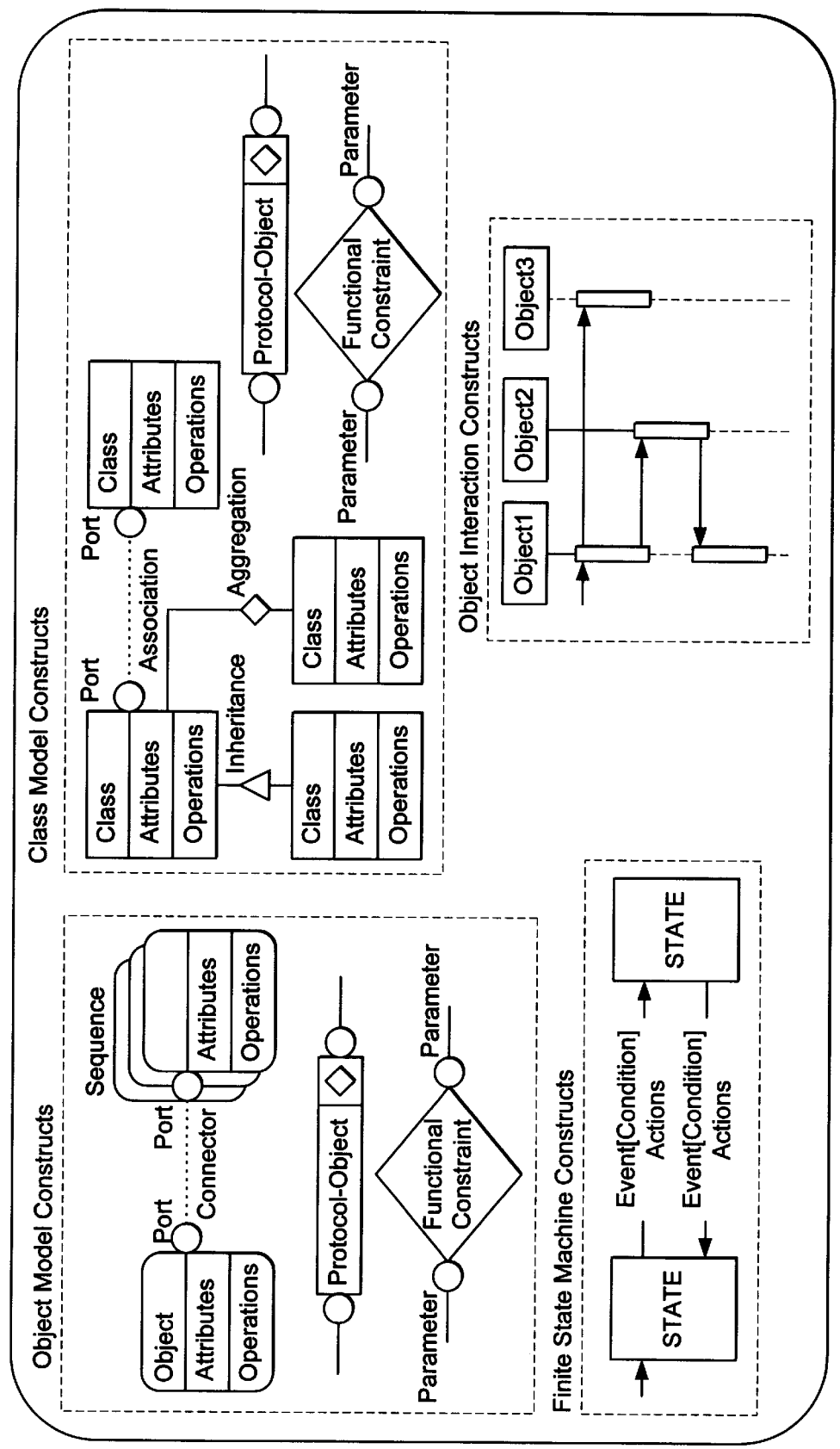
FIG. 2 illustrates the main visual constructs provided by the computer programs according to the present invention.

The main visual constructs provided by the computer programs 118 are shown in FIG. 2. The reactive behavior of each object is specified by associating an extended finite state machine (FSM) with it (another way to specify behavior is by using Object Interaction Diagrams).

An FSM of an object captures the reactions of this object to received messages. Receipt of a message is treated as an event, which may cause a state transition, and concomitantly initiating the reactions, wherein reactions are asynchronous messages with limited scope.

An object can send messages to itself, its immediate sub-objects, its parent object, or its ports. Ports of sibling objects can be connected by behavioral relations, each of which has an FSM controlling the message exchanges over these connected ports. Thus, a typical model is a part-of hierarchy of objects with relations (both behavioral and functional) among siblings and the behavior of these objects is controlled by FSMs.

The computer programs 118 include a Builder that allows creation and execution of models, as described in D. Gangopadhyay, S. Mitra and S. S. Dhaliwal, *ObjChart-Builder: An Environment for Executing Visual Object Models*, Proceedings of the Eleventh International Conference and Exhibition of TOOLS U.S.A. 1993 (Technology of Object-Oriented Languages and Systems), Prentice-Hall, 1993, which publication is incorporated by reference herein.

The Builder embodies a constraint solver and FSM interpreter for executing diagrams in the present invention. For further details on the language and model specification used in the present invention, see D. Gangopadhyay and S. Mitra, *ObjChart: Tangible Specification of Reactive Object*

*Behavior*, Proceedings of the European Conference on Object Oriented Programming (ECOOP '93), Vol. 707, pages 432–457 of Lecture Notes in Computer Science, 1993, which publication is incorporated by reference herein, while further details on model execution are available in D. Gangopadhyay, S. Mitra and S. S. Dhaliwal, *ObjChart-Builder: An Environment for Executing Visual Object Models*, Proceedings of the Eleventh International Conference and Exhibition of TOOLS U.S.A. 1993 (Technology of Object-Oriented Languages and Systems), Prentice-Hall, 1993, which publication is incorporated by reference herein.

The semantics of reactive objects of the present invention are provided in D. Gangopadhyay and S. Mitra, *ObjChart: Tangible Specification of Reactive Object Behavior*, Proceedings of the European Conference on Object Oriented Programming (ECOOP '93), Vol. 707, pages 432–457 of Lecture Notes in Computer Science, 1993, which publication is incorporated by reference herein, using an equational formalism described in J. Misra, *Equational reasoning about nondeterministic processes*, Formal Aspects of Computing, Vol. 2, pages 167–195, 1990, which publication is incorporated by reference herein. The operational semantics of the present invention have been implemented along the same lines.

Behavioral descriptions are presented (primarily) using the state machine arc-language of the present invention (for details, see D. Gangopadhyay and S. Mitra, *ObjChart: Tangible Specification of Reactive Object Behavior*, Proceedings of the European Conference on Object Oriented Programming (ECOOP '93), Vol. 707, pages 432–457 of Lecture Notes in Computer Science, 1993, which publication is incorporated by reference herein).

Some simple behavior descriptions can also be provided using the Object Interaction Diagrams as shown in FIG. 2, which use constructs similar to the arc-language. The FSM of each object has arcs, that are labeled using the arc-language, that is, each arc has a label of the form:

$$\frac{e[c]}{a}$$

where e is the input event (which would either be atomic or could contain a list of parameters which gets matched with actual values during execution), c is a (side-effect free) conditional, and a is one or more actions, which are of the form:

$$o_1 < e_1, \ldots, o_n < e_n$$

where $n \geq 0$.

It is assumed that whenever an object receives a matching event (in the proper state) and the associated condition "holds," the events in the action part are transmitted, in parallel, to the corresponding recipient objects. Therefore, it is not possible to directly express sequencing among events that appear as a part of a given action-list. Sequencing, however, can be simulated, if the exact execution semantics are known.

Another important drawback of the current system is that conditions, which could consist of method calls, expressions involving relational connectives (like>, $\geq$, etc.), and built-in functions (such as GetAttribValue, GetName, etc.), cannot be subjected to step-wise refinement, i.e., once one of these constructs is used to define the condition, it is not possible to refine them further using any of the visual notations of the present invention.

The primary goal of the present invention is to suggest changes such that conditions can be independently refined, and ordering can be imposed on the individual components of the action-list of an arc. This is accomplished by providing the following extensions to the arc-language.

The condition part of the arc-language is extended by allowing calls to other events (obeying encapsulation rules). Thus, the following arc-label can thus be implemented:

$$\frac{e[O.E(X)]}{SetAttribValue('attrib', X)}$$

where E is an event associated with an object o, such that o is in the scope of the current object (i.e., o could be one of the sub-objects, or ports, or could be the reserved words "parent" or "self").

This addition allows step-wise refinement, since E could be the event of an arc, which can be refined using its actions (the actions could invoke events on objects which are in the scope of o, and so forth).

In order to introduce sequentiality into the arc-language, the operator ";" is provided as a connective between individual actions that constitute the action part of an arc. Therefore, the following applies:

$$\frac{e(x)[seq.GetCount(C), sub1(C, D)]}{seq \ll newElement(); seq[D] \ll SetAttribValue('attrib', X)}$$

where seq is a Sequence object.

In the previous arc-language, it would be necessary to introduce an additional state (to wait for the new element to get created) before sending it the SetAttribValue message. (Note that a method sub1 has to be used to get D from C; this is because elements of a sequence are indexed starting at 0 and not 1.)

As an outcome of the suggested extensions, the following observations can be made:

Methods truly become a short-hand of events. With the possibility of invoking events on objects in the condition part, methods are not needed other than as a short-hand.

Explicit control on execution of parts of an action-list is provided, which becomes necessary whenever sequencing has to be expressed (this specification later discusses how explicit sequencing is better than the prior version of enforcing sequentiality between events).

Although event calls can be used uniformly in the condition and action parts of an arc label, there is still a subtle difference between the two: a condition has to be fully evaluated before a commitment is made to the execution of the arc; however, the actions may take place at any future time (of course, respecting the dependency enforced by the newly introduced ";" operator). In other words, condition evaluation still takes place synchronously, while actions are emitted out asynchronously, to be handled at a later time.

Within the actions themselves, due to the new connective, a new meaning has to be introduced. For example, if a( ); b( ) is an action-list, this means that b( ) will be activated after a( ) has been completed. Note that the completion of the first action may mean doing other actions. For example, if:

$$\frac{a()[true]}{a1(), a2()}$$

is an arc specification for a( ), then a1( ) and a2( ) (and recursively, their reactions, if any) have to be completed before b( ) is activated in the a( ); b( ) action-list. Therefore, a new notion, that of completion (or quiescence) of an action, is introduced into the semantics.

Since the dichotomy between methods and events are being removed, the latter must return values (as in the first example, where E returns a value in X, which later gets used in SetAttribValue).

Due to the introduction of the ";", there can be data exchange between parts of a given action-list. For example, the following transition:

$$\frac{ev[c]}{o \ll e(X); o \ll E(X)}$$

is considered legal (where X is a variable which gets bound in the invocation of e; this bound value being later used in the invocation of E).

It is possible to have delayed bindings of targets for messages in the action part of an arc. For example, the following can be used:

$$\frac{ev(X)[c]}{seq \ll getCount(C); sub1(C, D); seq[D] \ll msg(X)}$$

Note that, when the actions are emitted out (after the event matches, and the condition is evaluated), C and D are still unknowns, and therefore so is the target of the message:

seq[D]<msg(X)

Similar situations could occur even when the target of a message is a regular (non-Sequence) object, as with the following:

$$\frac{ev(X)[true]}{self \ll getTarget(T); T \ll msg(X)}$$

In fact, the following combination of the two could be performed (in which the target is a sequence, however, its name is not available until after actions have been emitted; similarly for the index):

$$\frac{ev(X)[true]}{self \ll getSeqName(S); self \ll getIndex(I); S[I] \ll msg(X)}$$

The present invention, and its implementation in the computer programs 118, handles all of these issues.

The rest of this specification is organized as follows. Section 2 is a description of how sequentiality can be achieved in the arc-language (with knowledge of the exact execution semantics, though), which also illustrates with examples some of the drawbacks of this method. Section 3 describes an extended arc-language that solves the problem of sequential events in a much more elegant way. Section 4 discusses operational semantics for the extended arc-language, after showing that a naive model may lead to deadlocks. Section 5 describes implementation issues, which also solves another problem of carrying variable bindings from one event to another in a single action-list, and using events in a call-return fashion. Finally, Section 6 concludes with examples of the extended capabilities of the arc-language.

2. Previous Approach for Sequencing

Execution semantics for the prior version of the Object Modeling Tool are described in D. Gangopadhyay and S. Mitra, *ObjChart: Tangible Specification of Reactive Object Behavior*, Proceedings of the European Conference on Object Oriented Programming (ECOOP '93), Vol. 707, pages 432–457 of Lecture Notes in Computer Science, 1993, which publication is incorporated by reference herein, using Misra's work on non-deterministic data-flow networks, as described in J. Misra, *Equational reasoning about nondeterministic processes*, Formal Aspects of Computing, Vol. 2, pages 167–195, 1990, which publication is incorporated by reference herein.

Therefore, the following assumptions hold about the execution model:

messages are asynchronous;

each node in the data-flow network (i.e., each object) maintains a queue of messages sent to it;

the message queues are unbounded, but have a first-in first-out (FIFO) discipline; and message transmission is instantaneous (i.e., takes zero time).

In other words, whenever an object receives a matching event (and the corresponding condition holds), the events in the action part are dispatched to the corresponding recipients in zero time.

Therefore, following the above rules, the only possible way to ensure that an object received two (or more) messages in a given sequence is to make sure that the second one was generated after the first one was received (i.e., the concerned object had to send out the first message and go to an intermediate state before sending out the second message).

This dependence leads to a painful explosion of intermediate states in the FSMs, for no reason other than to sequence events to a given object. As discussed above, in the prior version of the Object Modeling Tool, it is possible to force actions in a particular order, although at some expense.

The only way to enforce sequentiality is by introducing additional states. For example, in order to have e' be handled after e (by an object o), the FSM depicted in FIG. 3 must be used (if self is distinct from o). Note that the middle state is a "spurious" state that is needed for sequencing.

Furthermore, since computation is event driven, the additional event E is introduced to trigger the object in this new state. The goal of the present invention is to be able to directly substitute o<<e' in place of self<<E in the very first state.

Figure 3:
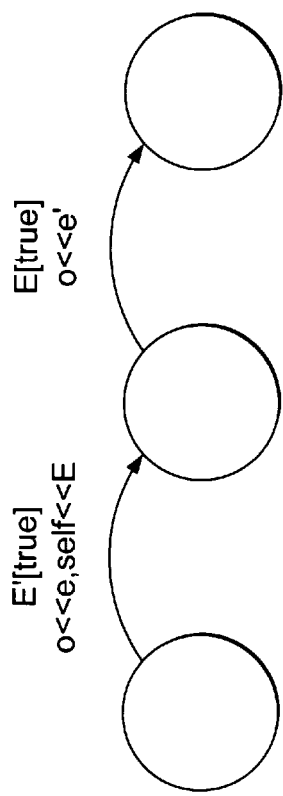
FIG. 3 illustrates a first finite state machine for sequencing by introducing artificial states.
Figure 4:
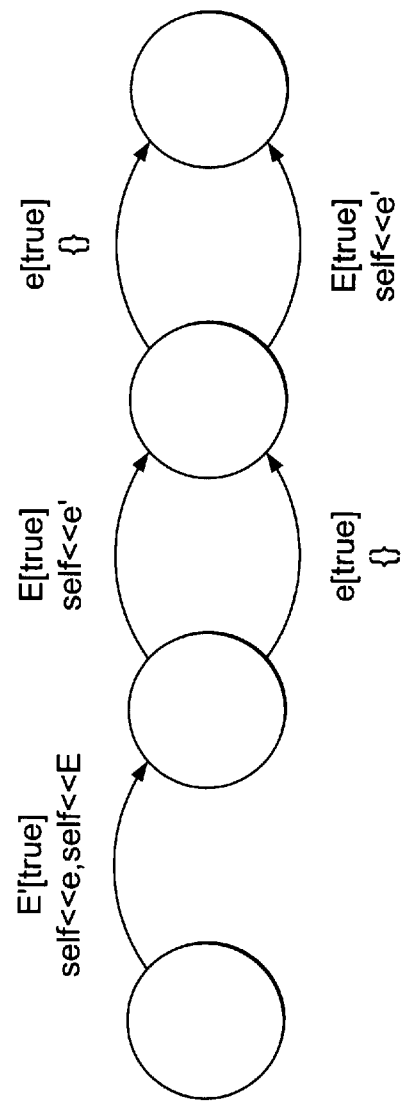
FIG. 4 illustrates a second finite state machine for sequencing by introducing artificial states.
Figure 5:
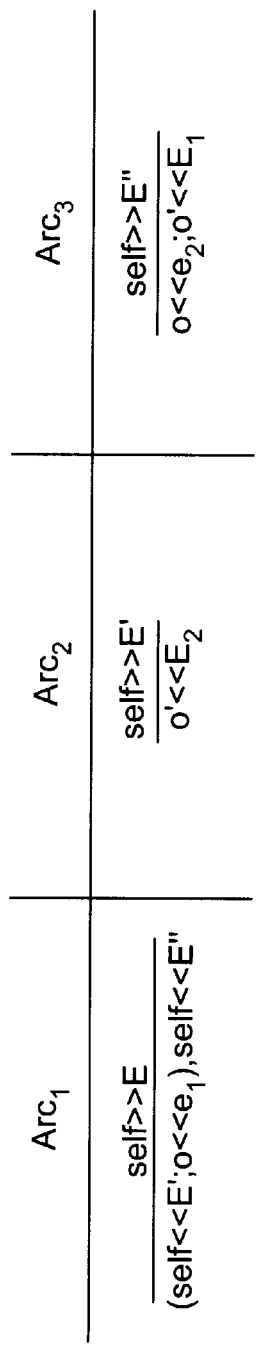
FIG. 5 illustrates an arc-label with an extended signature.

In FIG. 3, if o and self are allowed to be identical, then the situation is even more complicated, and the FSM depicted in FIG. 4 would be required. In this case, e and E are both incident on the same object, and due to the inherent parallelism between actions separated by ",", further states, i.e., the two middle states, have to be introduced to keep track of which of these events actually arrived. More importantly, the only way to introduce sequentiality would intimately depend on the semantic model (or operational model) chosen, and this is quite unsatisfactory.

The situation is particularly painful for Sequence objects (a special construct), for which it is customary to create a new element before invoking some operation (entering a value for an attribute, say) on the entry just created.

For instance, consider the CheckView example outlined in Section 2 of D. Gangopadhyay and S. Mitra, *ObjChart: Tangible Specification of Reactive Object Behavior*, Proceedings of the European Conference on Object Oriented Programming (ECOOP '93), Vol. 707, pages 432–457 of Lecture Notes in Computer Science, 1993, which publication is incorporated by reference herein. With the prior version of the Object Modeling Tool, an additional state would have to be introduced, each time such an operation has to be performed.

Furthermore, it is common to have safety properties associated with objects, which are usually depicted by arcs with the same event for all states of the object (albeit doing slightly different things depending on the state in which the event was received). For instance, consider the example of specifying an Elevator control system, as depicted in Section 4.1 of D. Gangopadhyay and S. Mitra, *ObjChart: Tangible Specification of Reactive Object Behavior*, Proceedings of the European Conference on Object Oriented Programming (ECOOP '93), Vol. 707, pages 432–457 of Lecture Notes in Computer Science, 1993, which publication is incorporated by reference herein.

Therefore, if sequentiality has to be expressed by adding states for any such object, all the safety-related arcs have to be replicated for each of these spurious states, thus compounding the problem many fold.

3. Extended Arc-Language

The present invention introduces an additional connective into the arc-language. This connective, which is denoted as ";", could be used in the action part of the arc-language. With this extended arc-language, sequencing for both examples considered above in Section 2 can be performed, respectively, as:

$$\frac{E'[true]}{o \ll e; o \ll e'}$$

and $$\frac{E'[true]}{self \ll e; self \ll e'}$$

In fact, with this extended arc-language, the arc-labels depicted below can be used:

$$\frac{e[c]}{o_1 \ll e_1, (o_2 \ll e_2; o_3 \ll e_3)} \quad \frac{e[c]}{(o_1 \ll e_1, o_2 \ll e_2); o_3 \ll e_3}$$

In contrast, if the brute-force mechanisms of introducing sequentiality were used, as described in Section 2 above, these would require numerous additional states to be introduced. Given this extended signature of the actions, it is now possible to specify completely asynchronous or completely sequential computations (together with a mixture of the two, as shown by the examples above).

The new arc-language syntax can be specified using a Backus-Naur Form (BNF), wherein the unspecified nonterminals continue to have the same definitions as before:

```
ArcLabel       : := Event "[" Condition "]" Actions
Actions        : := NullActions |NonNullActions
NullActions    : :=
NonNullActions : := Action |
                   NonNullActions "," NonNullActions |
                   NonNullActions ";" NonNullActions |
                   "(" NonNullActions ")"
```

4. Operational Semantics

In this section, the operational semantics of the arc-language are extended, so as to include the additional connective introduced in Section 3 above. However, in doing so, an anomaly would be introduced, because of the interplay of the existing dependencies due to directed communication, two messages sent from the same source to a given destination as parts of two different action-lists should be handled in the correct order, with the newly introduced one, i.e., that due to the ";" operator. In fact, because of these two different dependencies, a deadlock situation is possible, which can be shown using the arcs of FIG. 5.

Figure 6:
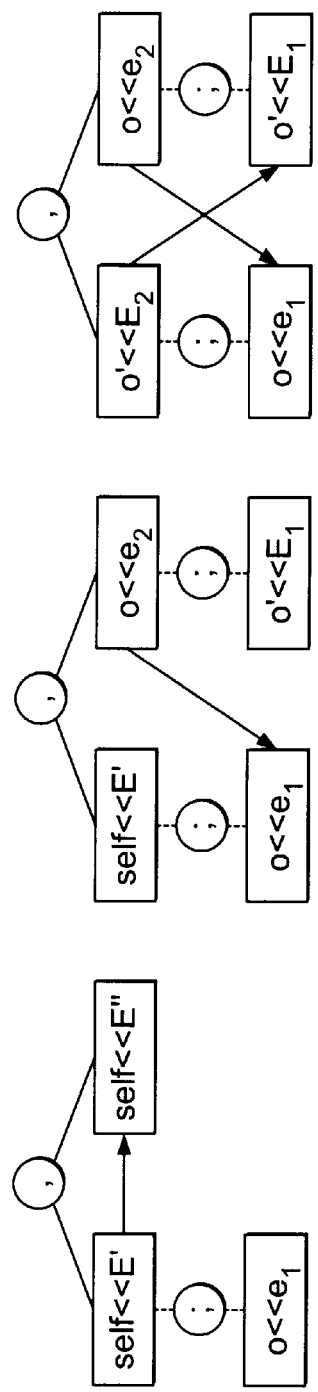
FIG. 6 illustrates a possible deadlock in a naive interpretation of the ";" connective.

In the first part of FIG. 6, the consequences of the first message, i.e., self<<E, are shown. The side arrows in FIG. 6 depict the dependence due to messages going to the same object, in this case, self. Notice that, in this case, the arrow could have been the other way around, i.e., from self<<E" to self<<E' if a different order for the "," operation is considered. In the second part of FIG. 6, the effect of self<<E" is shown; in the third part of FIG. 6, the effect of self<<E' is shown. At this stage, there exists a scenario in which none of the four messages can be handled: o'<<$E_1$ depends on o'<<$e_2$ (due to order dependence in the queue for the object o'); o'<<$E_1$ depends on o<<$e_2$ due to ";" in $Arc_3$; o<<$e_1$ depends on o<<$e_1$ since the latter was received by o before the former, and finally, o<<$e_1$ depends on o<<$E_2$ due to the ";" in $Arc_1$, and the expansion of self<<E' due to $Arc_2$. Therefore, there is a deadlock. (Note that it may be possible to have the deadlock even with 3 events, instead of the 4 events used here.)

It is possible to avoid deadlock once it is noticed that deadlock is caused due to the interplay of the two kinds of dependencies: one from message ordering on a given queue, and the other due to the ordering introduced by ";". Breaking either dependency would result in a deadlock free solution. Since, in some sense, both dependencies are required, the following way to break the deadlock has been developed:

Objects maintain their queues as before.

Whenever an action-list of the form e;e' is encountered, only e is dispatched and e' is stored. When the dispatch of e is completed, then the next outstanding event on the sequence of interest is dispatched (note that the next event could be one other than e', since e may have an action-list of the form E;E', which would result in the next dispatch being E).

5. Implementation

In view of this extended arc-language, certain data structures need to be maintained, which are explained in this section. The section also describes the pseudo-code for the implementation of the present invention, and provides more details about some of the features that are discussed in Section 1 above.

5.1. Object Queues

Each object maintains a first-in first-out (FIFO) queue of messages sent to it, i.e., messages to a given object are processed in the order they are received.

5.2. Sequential/Parallel Structure (SPS)

In order to ensure that ";" and "," are treated in the correct order, actions of arcs are parsed into a binary tree structures, based on the BNF grammar provide in Section 3 above (previously, with "," being the only allowed connective between individual actions, it was sufficient to collect all individual actions into a list). For a parser component of the computer programs 118 to work correctly, a precedence has to be specified between the connectives ("," has higher precedence than ";") and their associativity (both associate to the left). However, explicit parentheses is the best way to clearly nest the connectives.

Also, an interpreter component of the computer programs 118 keeps a binary tree of all the outstanding events (which have been generated, but not yet consumed) in the system. This tree is called the Sequential Parallel Structure (SPS). The interpreter operates on this tree structure, for example, to dispatch b after a has completed, with the dependency being a( ); b( ). Section 5.4 below provides more details on the interpreter component of the computer programs 118.

5.3. Symbol Table

A symbol table is essentially an association list for variable names and corresponding values. Each parameter passed to the event is in the symbol table, and so are all the variables used in the condition and action parts. With the prior version of the arc-language (without ";"), it was sufficient to associate symbol tables directly with the arc data structures. This is because, with a matching event, all the variables are bound by the time the condition is evaluated. Therefore, it suffices to simply replace the variables with their bindings in the action-list, before those events are sent out to their corresponding recipients.

With ";" and the ability for events to return values, the situation gets more complicated, as can be seen from the following example:

$$\frac{\text{fact}(X, Y)[X > 1, \text{sub1}(X, W)] \quad \text{fact}(X, Y)[X = 1, \text{assign}(Y, 1)]}{\text{fact}(W, Z); \text{mult}(Z, X, Y)}$$

which effectively computes the factorial of any positive integer X and returns the value in Y.

Assume that another arc has an action-list of the form:

$$\text{self<fact } (3, X); \text{ self<SetAttribValue('fact3',} X)$$

Figure 7:
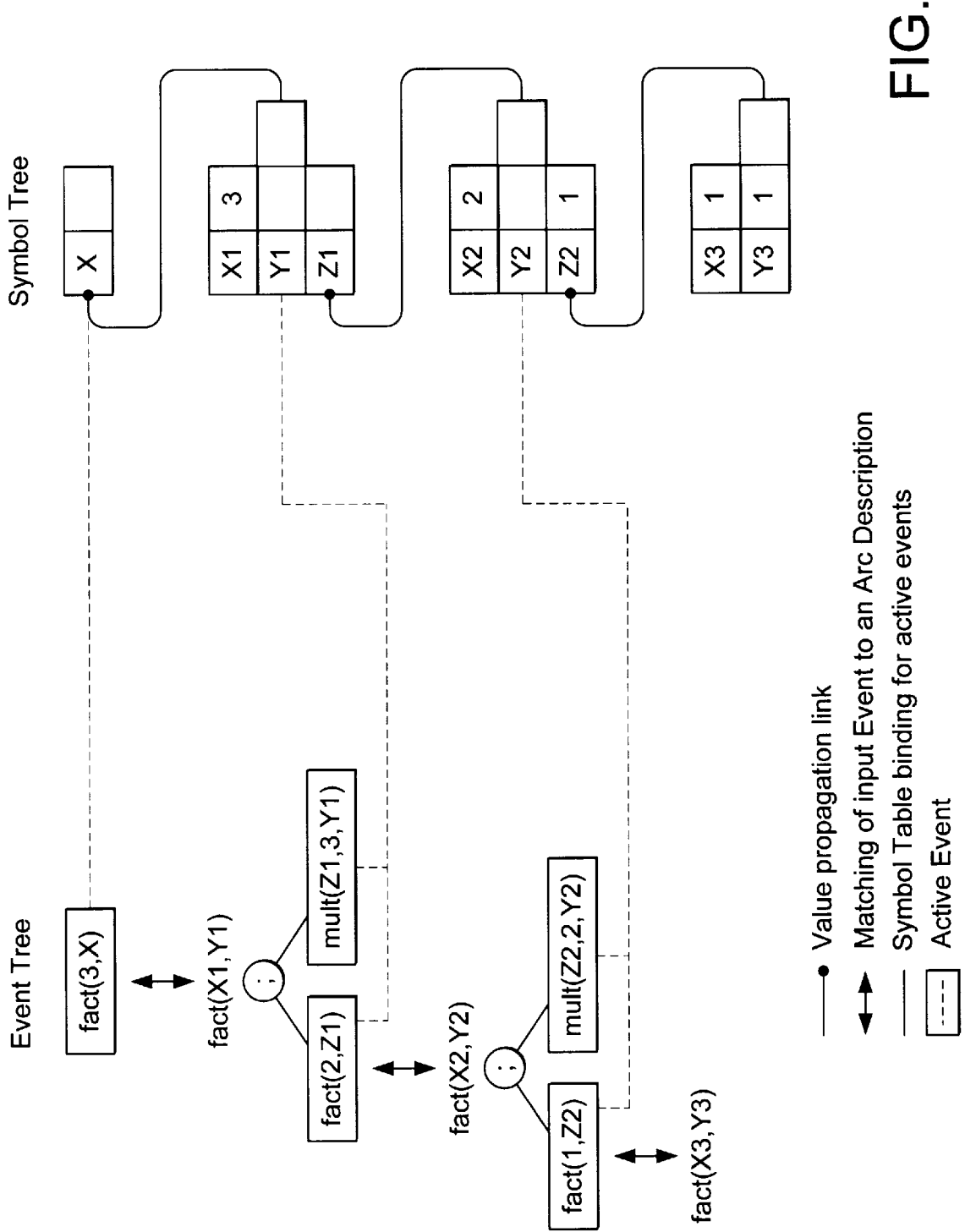
FIG. 7 illustrates the data structures used in interpreting the object modeling tool.

In effect, fact(3, X) would bind X to the factorial of 3 (i.e., 6), which would be saved in the attribute 'fact3'. During evaluation of the first event, at some point, the tree of messages as shown in FIG. 7 would result.

Thus, several copies of the symbol table are needed for the arc; in fact, the symbol tables need to be akin to activation records of usual programming languages.

In the implementation of the present invention, the symbol table is therefore taken out of the arc structure. Every time the event of an arc matched, a new symbol table instance is created, with all the variables found in that arc.

During condition evaluation, which takes place synchronously, the entirety of this table get updated whenever a binding is made for a variable. If condition evaluation fails, then this symbol table instance is useless, and is destroyed. On the contrary, if there is success, each individual action in the action-list gets associated with this symbol table.

Due to delayed binding introduced by ";" some of the entries in the symbol table may still be unbound as in the factorial example above, where Y1, Y2, etc., gets bound at the end of the evaluation step, and Z1, Z2, etc., gets bound after the recursive call to fact(W, Z) is terminated. Such variables may get bound later, which updates the symbol table.

Furthermore, since the symbol table is shared with the other actions from the same action-list, the updated value can be used by another action. For the above example, once Z2 gets assigned in the recursive call to fact(1, Z2 ), its value will be available in the call to mult(Z2, 2, Y2 ).

Finally, symbol tables are associated with reference counts. For example, in the current status of the snapshot depicted in FIG. 7, the reference count for the second and third symbol tables (each of which has 3 entries) is 2, since each is shared between two action nodes. The count is initially set to the number of elementary actions in the action-list, after condition evaluation.

Whenever an event is completed (roughly, either when there are no matching arcs, or after the match has been determined and the arc's new symbol table has been created) this count is decremented. Whenever the count goes to zero, the symbol table itself may be discarded.

FIG. 7 is a "snapshot" of the Factorial example as represented in the memory of the computer 100. The snapshot reflects the point where the event fact( 1,Z2 ) has matched, before the corresponding symbol table gets discarded. Note that several invocations of the arc are active at the same time, and that they need different symbol tables, since the values X=Y1, Z1=Y2, etc., are still unbound, and these variables have to get bound to distinct values for a correct expansion of Factorial.

5.4. Implementation

Figure 8:
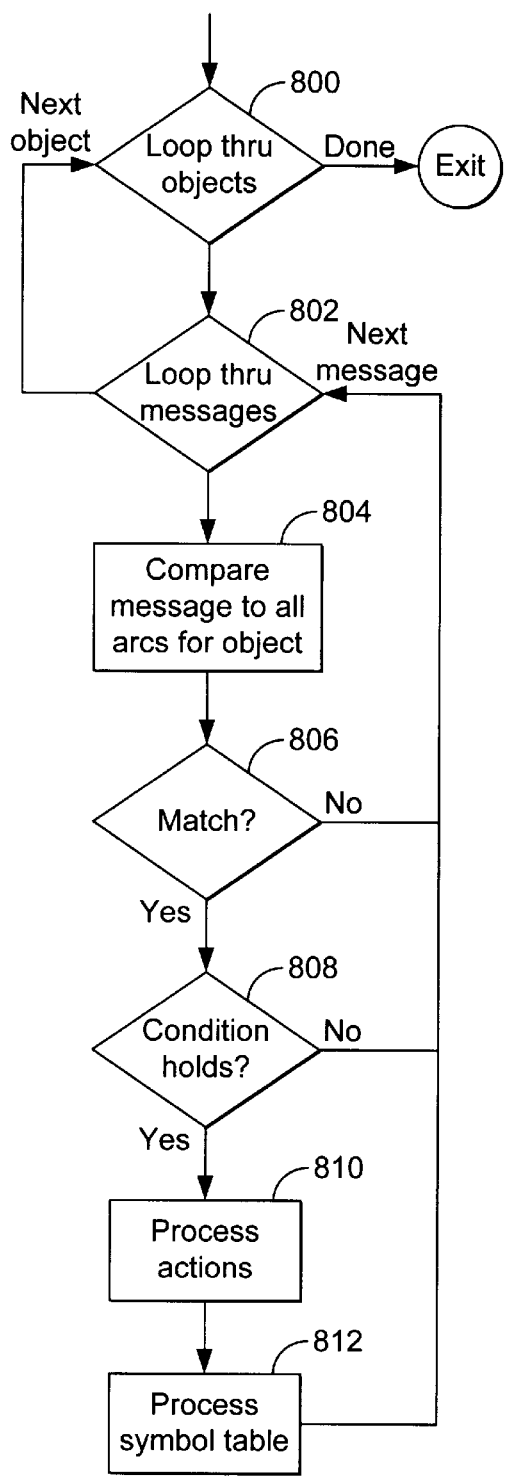
FIG. 8 is a flowchart that illustrates some of the steps performed by the computer programs of the present invention.

FIG. 8 is a flowchart that illustrates some of the steps performed by the computer programs 118 according to the present invention.

Block 800 is a decision block that represents the computer 100 looping through all objects. The present invention uses time slicing, wherein an object with a non-empty queue of messages gets a turn in every time-slice.

Block 802 is a decision block that represents the computer 100 looping through all messages for the object. During its time slice, an object extracts messages from its queue. Events in the queues of objects also are a part of the SPS.

Block 804 represents the computer 100 comparing the message to the finite-state machines for the object. The FSMs are consulted to determine whether the arcs of the FSM match the event message.

If a matching arc is found (Block 806 ), and the corresponding condition holds (Block 808 ), then Block 810 represents the computer 100 processing the corresponding action. This step also introduces all the variables in the arc triple (event, condition and action) into the symbol table (with possible bindings, whenever they exist).

As part of its processing, Block 810 also performs the following steps:

(a) If the arc under consideration has no actions (for example, setAttribValue), then the event is removed from the queue of the object and the SPS. As a result, it may become necessary to delete some of the nodes in the SPS, using the following rules:
1. [Rule for ","] If either branch of e',e" has been completed, then replace "e',e" with the existing branch.
2. [Rule for ";"] When the left branch of e'; e" is completed (notice that the left branch must complete before the right one is started), then this subtree is replaced by e". At the same time, the right branch (i.e., e") must be introduced into the object queues, using the procedure described in Step (b) below).

(b) If the arc has one or more actions, then the current event is removed from the object's queue. In the SPS, the event is replaced by the tree of actions. Finally, some of these new actions have to be introduced within the object queues, using the following rules:
1. [Base] If there is a leaf node, then append the corresponding action into the event queue of the concerned object(s).
2. [Recursive Case for ","] If there is a node, then recursively apply the procedure to both sub-trees.
3. [Recursive Case for ";"] In this case, recursively call the same procedure on the left branch (with the understanding that when processing of the left branch is done, the right will be handled, as mentioned in Step (a)(2) above).

Block 812 represents the computer 100 processing the symbol tables. Every node in the SPS tree stores a pointer to the (corresponding) symbol table. These pointers are initialized when the actions are introduced into the SPS in Step (b) above. Actions are allowed to make additional bindings to variables in the symbol table passed to it. Thus, since the same symbol table gets passed to different actions in an action-list, a variable bound in an action can be used by a later action in a ";" operation. There will also be a need to delete symbol tables, which is accomplished using reference counts (which is set when the actions of a given arc are introduced into the SPS; thereafter, whenever any part of it gets done, the count is decremented, until all references are gone, when the symbol table itself is removed).

5.5. Support for Event Calls from Conditions

In order to have ";" and data communication between individual actions separated by this connective, the symbol table is extracted from the arc-structure and made like activation records. With that, events can return values, and can therefore be used in situations where methods were needed before. Thereafter, making conditions invoke them is straightforward, once the following are resolved.

In general, conditions have to be evaluated synchronously, while actions are handled asynchronously. Thus, when an arc event is invoked from a condition, its consequent actions cannot be inserted into the global SPS, since, if they are, then the completion of this arc-evaluation (and thus the invoking condition) would depend on when the corresponding objects get their turn to execute, as so forth. Therefore, a local copy of the event tree (similar in structure to the global SPS) is kept whenever a condition invoked an event. Also, any resulting reactions for any of the events in this local tree are merged into the local tree. Finally, all events of this tree are handled without any further time slicing.

A second issue relates to the details of the implementation and involves a function known as "TraverseListForEventMatch". In this function, the arc-list for a state have to be traversed. With events being called from conditions, this list is duplicated before the traversal, since, without duplication, condition evaluation would traverse the same global list, and would cause erroneous results when matching of events to arcs also march on the same list. Thus, this involves an issue of having a local list pointer, rather than of duplication itself. Another way to circumvent the problem is to implement lists where cursors could be given to individual clients, without having to duplicate the list, as such.

5.6. Lazy binding for Targets of Messages

With ";", it is possible that the target of a message is unknown (an unbound variable) when condition evaluation takes place (see examples in Section 1 above). However, when the time comes to dispatch the message, the target must become known (bound). A change is needed in a "BuildAction" function to handle this, together with checking explicitly for unbound targets at the time of dispatching an event to the corresponding object queues, which could be much after BuildAction, since ";" may cause some events which have been handled by BuildAction to be frozen in the SPS, until everything that such an event depends on has been evaluated.

6. Examples

In this section, the new arc-language is illustrated using a few examples.

6.1. Factorial

Figure 9:
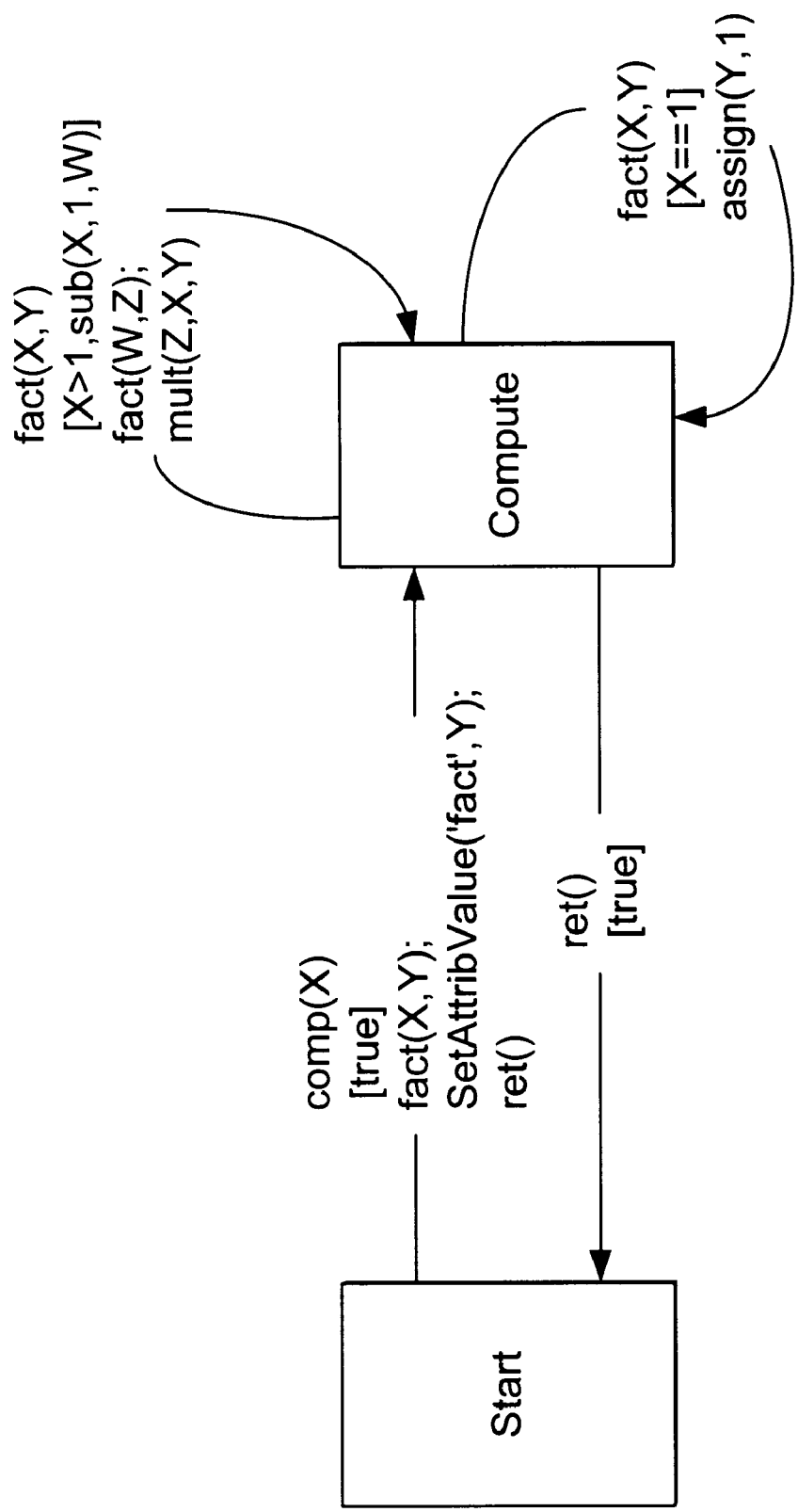
FIG. 9 illustrates a finite state machine for the factorial example of FIG. 7.

The first example is a Factorial function, along the lines of the example given in Section 5.3 above. Only one object is needed for this example, the state machine for which is depicted in FIG. 9. Notice that the sub (subtract), mult (multiply) and assign (assignment) functions, as shown in FIG. 9, are all implemented as methods in the present invention.

This example would be impossible to encode in the prior version of the arc-language, since without the currently introduced extensions, it would not be possible for events to return values back to the caller. Therefore, the new constructs have added to the expressive power of the arc-language of the present invention, since, with these additions, any general recursive function can be encoded.

In the example, methods have been used on three occasions; in fact, all of these could be avoided in favor of using only built-in events and additional attributes. For example, instead of sub (subtract), the built-in function SetAttribvalueSubtractedBy could be used. Similarly, instead of using assign(X, Y), the built-in function SetAttribValue('assign', X) followed by GetAttribValue('assign',Y) could be used. However, the current functions are quite cumbersome. Therefore, there is a need to enhance the arc-language further by allowing simple functions in them.

6.2. Collection Scheme

Figure 10:
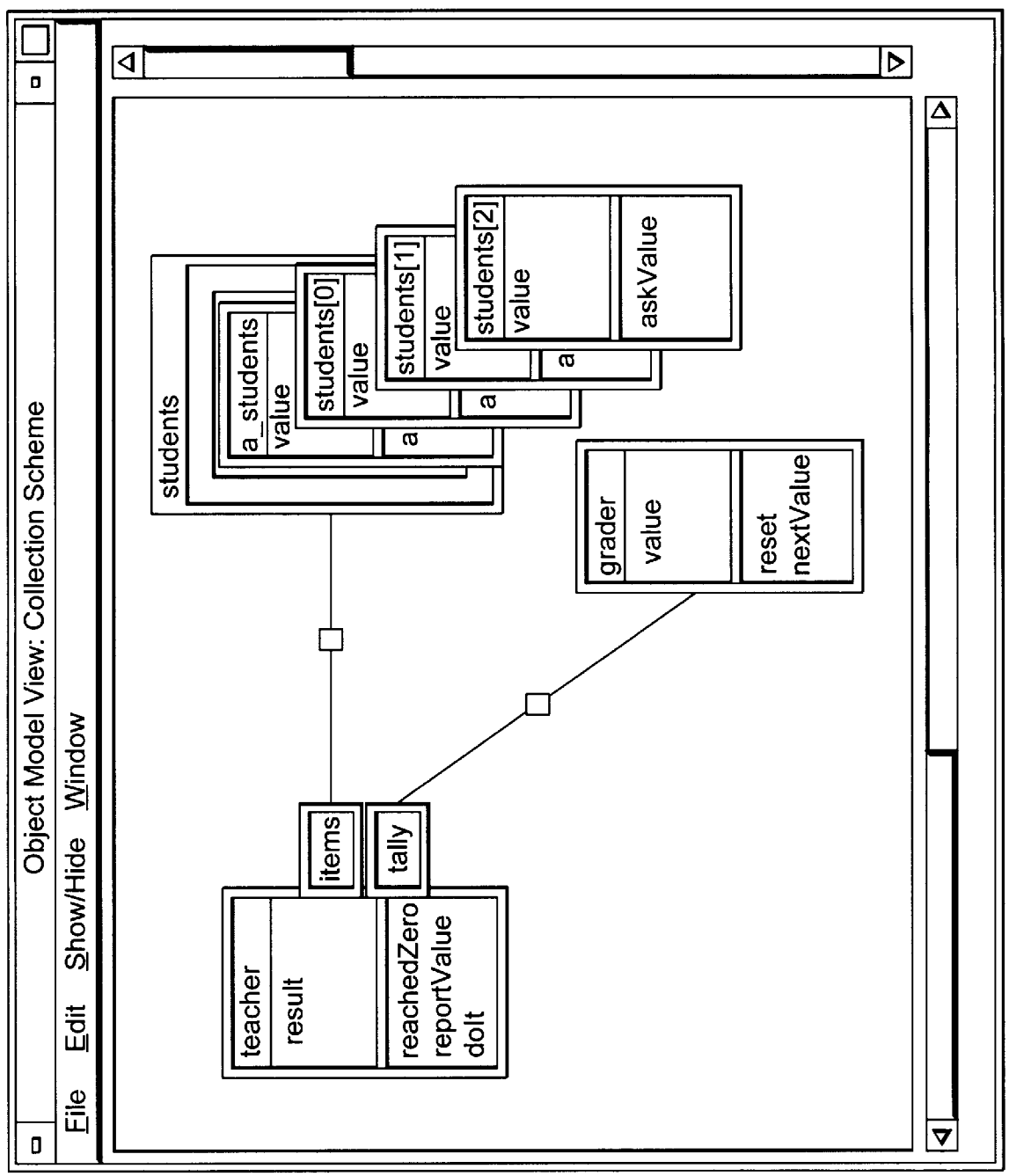
FIG. 10 illustrates a user interface of the object modeling tool depicting objects in a collection scheme.

The next example that is considered is of a collection scheme, using the objects shown in FIG. 10. The teacher object has a sequence of student objects attached to its items port, and a grader object attached to its tally port. The teacher object calculates and stores a tally of the value attributes of the student objects in its result attribute. In order to get the tally, the teacher object has a count (as a sub-object) which knows the number of student objects to iterate on via its items port. The teacher object requests the value for each of its student objects. When a student object reports its value, the teacher object gives the value to the grader object via its tally port, and concurrently decrements the count sub-object. Finally, when the count sub-object reaches zero, the teacher object retrieves the total value from the grader object, and records that in the result. The FSM for the teacher object is shown in FIG. 11.

If the model is executed repeatedly, the results would be incorrect, at least for some executions. The main problem is due to the asynchronous nature of messages. For example, for the doIt message, which starts the execution, its actions are all in parallel. Thus, depending on which of the actions get consumed first, the count sub-object and grader object (either one or both) may be with the wrong state when the reportValue messages arrives.

Similarly, considering the reportvalue message itself, it can be seen that its actions decrement the count sub-object and reports to the grader object in parallel. Thus, if the message to the count sub-object gets handled before the nextValue message, then the grader object is not in sync with the count sub-object, leading to the declaration of reachedZero (which is when the grader object reaches zero) message to be received before the grader object adds all the values, which may cause an incorrect result.

Figure 11:
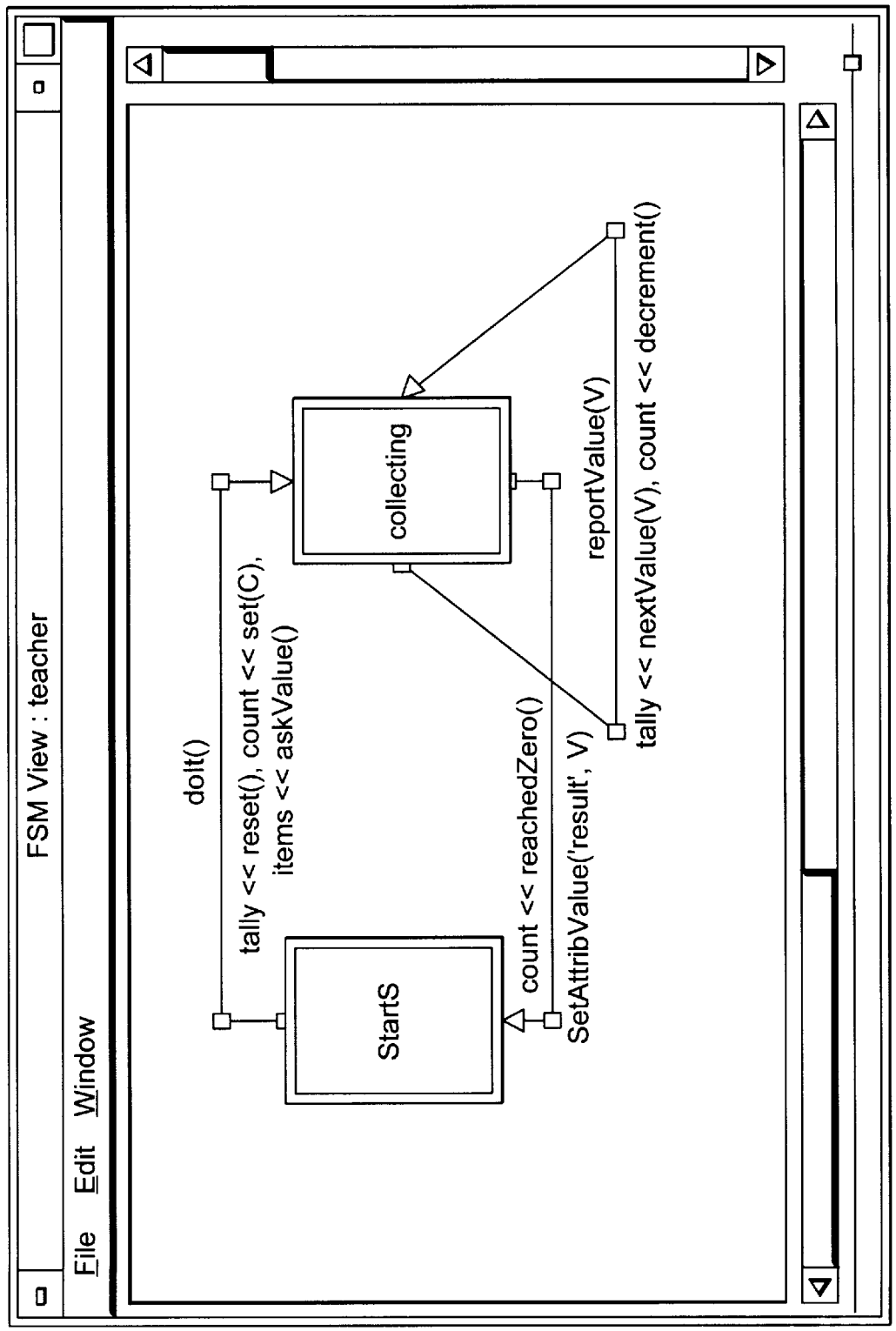
FIG. 11 illustrates a user interface of the object modeling tool depicting a finite state machine for the objects in the collection scheme of FIG. 10.

One way to correct these problems would be to use the following arcs to replace the corresponding ones in FIG. 11:

$$\frac{\text{doit( )[items, getCount}(C)]}{(\text{tally} \ll \text{reset( ), count} \ll \text{set}(C)); \text{items} \ll \text{askValues( )}}$$

and $$\frac{\text{reportValue}(V)[\text{true}])}{\text{tally} \ll \text{nextValue}(V); \text{count} \ll \text{decrement( )}}$$

Thus, using the newly introduced ";" connective, it is possible to synchronize activities of different objects. Although, as noted earlier, it would have been possible to have a similar effect by adding wait states and dummy messages, this solution is much more elegant and declarative, and is independent of the operational semantics of the language.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer-implemented method of object modeling, comprising:
    (a) creating an object model in a computer-implemented object-oriented modeling system using an arc language to model behaviors of one or more objects and associate one or more finite state machines with the one or more objects within the object model;
    (b) expressing a sequence of actions without introducing an intermediate state using the arc language for the behaviors of the objects within the object model; and
    (c) executing the expressed sequence of actions in the computer-implemented object-oriented modeling system.

2. The computer-implemented method of claim 1 above, wherein the expressing comprises specifying a connective operator between actions within the arc language to express the sequence of actions.

3. The computer-implemented method of claim 2 above, wherein the connective operator comprises an ";" operator.

4. The computer-implemented method of claim 2 above, wherein the connective operator provides for data exchange between actions in the sequence of actions.

5. The computer-implemented method of claim 1 above, wherein a subsequent action in the sequence of actions is dispatched only when a previous action is completed.

6. The computer-implemented method of claim 1 above, wherein the behaviors are reactive behaviors.

7. The computer-implemented method of claim 1 above, wherein each arc in the arc language comprises an event-condition-actions triple.

8. The computer-implemented method of claim 7 above, wherein events return values.

9. The computer-implemented method of claim 7 above, wherein conditions invoke events.

10. The computer-implemented method of claim 1 above, wherein the creating further comprises specifying the behaviors of the objects within the object model using object integration diagrams with one or more of the objects.

11. A computer-implemented object modeling apparatus, comprising:
    (a) a computer;
    (b) means, performed by the computer, for creating an object model in a computer-implemented object oriented modeling system using an arc language to model behaviors of one or more objects and associate one or more finite state machines with the one or more objects within the object model;
    (c) means, performed by the computer, for expressing a sequence of actions without introducing an intermediate state using the arc language for the behaviors of the objects within the object model; and
    (d) means, performed by the computer, for executing the expressed sequence of actions in the computer-implemented object-oriented modeling system.

12. An article of manufacture comprising a computer program carrier tangibly embodying one or more computer programs that, when executed, cause the computer to perform a method of object modeling, the method comprising:
    (a) creating an object model in a computer-implemented object oriented modeling system using an arc language to model behaviors of one or more objects and associate one or more finite state machines with the one or more objects within the object model;
    (b) expressing a sequence of actions without introducing an intermediate state using the arc language for the behaviors of the objects within the object mode; and
    (c) executing the expressed sequence of actions in the computer-implemented object-oriented modeling system.

13. The apparatus of claim 11 wherein the means for expressing comprise means for specifying a connective operator between actions within the arc language to express the sequence of actions.

14. The apparatus of claim 13 wherein the connective operator comprises an ";" operator.

15. The apparatus of claim 13 wherein the connective operator provides for data exchange between actions in the sequence of actions.

16. The apparatus of claim 11 wherein a subsequent action in the sequence of actions is dispatched only when a previous action is completed.

17. The apparatus of claim 11 wherein the behaviors are reactive behaviors.

18. The apparatus of claim 11 wherein each arc in the arc language comprises an event-conditions-actions triple.

19. The apparatus of claim 18 wherein events return values.

20. The apparatus of claim 18 wherein conditions invoke events.

21. The apparatus of claim 11 wherein the means for creating further comprise means for specifying the behaviors of the objects within the object model using object integration diagrams with one or more of the objects.

22. The article of manufacture of claim 12 wherein the expressing comprises specifying a connective operator between actions within the arc language to express the sequence of actions.

23. The article of manufacture of claim 22 wherein the connective operator comprises an ";" operator.

24. The article of manufacture of claim 22 wherein the connective operator provides for data exchange between actions in the sequence of actions.

25. The article of manufacture of claim 12 wherein a subsequent action in the sequence of actions is dispatched only when a previous action is completed.

26. The article of manufacture of claim 12 wherein the behaviors are reactive behaviors.

27. The article of manufacture of claim 12 wherein each arc in the arc language comprises an event-condition-actions triple.

28. The article of manufacture of claim 27 wherein events return values.

29. The article of manufacture of claim 27 wherein conditions invoke events.

30. The article of manufacture of claim 12 wherein the creating further comprises specifying the behaviors of the objects within the object model using object integration diagrams with one or more of the objects.

* * * * *